US012686565B2

(12) United States Patent
Dudek et al.

(10) Patent No.: US 12,686,565 B2
(45) Date of Patent: Jul. 21, 2026

(54) TRANSFER DEVICE

(71) Applicant: INTERROLL HOLDING AG, Sant'Antonino (CH)

(72) Inventors: Siegmund Dudek, Hückelhoven (DE); Christian Hagmaier, Hückelhoven (DE)

(73) Assignee: Interroll Holding AG, Sant'Antonino (CH)

( * ) Notice: Subject to any disclaimer, the term of this patent is extended or adjusted under 35 U.S.C. 154(b) by 147 days.

(21) Appl. No.: 18/255,551

(22) PCT Filed: Dec. 8, 2021

(86) PCT No.: PCT/EP2021/084717
§ 371 (c)(1),
(2) Date: Jun. 1, 2023

(87) PCT Pub. No.: WO2022/122792
PCT Pub. Date: Jun. 16, 2022

(65) Prior Publication Data
US 2024/0025653 A1     Jan. 25, 2024

(30) Foreign Application Priority Data

Dec. 10, 2020     (DE) ..................... 10 2020 132 966.0
Apr. 27, 2021     (DE) ..................... 10 2021 110 697.4

(51) Int. Cl.
B65G 17/34          (2006.01)
(52) U.S. Cl.
CPC .................................. B65G 17/345 (2013.01)
(58) Field of Classification Search
CPC ....... B65G 17/345; B65G 47/53; B65G 47/94
See application file for complete search history.

(56) References Cited

U.S. PATENT DOCUMENTS 3,231,068 A      1/1966  Harrison et al.
4,096,936 A *    6/1978  Nielsen .................. B65G 39/00
                                                              198/370.06
(Continued)

FOREIGN PATENT DOCUMENTS

CN          1213636 A      4/1999
CN        111776618 A     10/2020
(Continued)

OTHER PUBLICATIONS

Office Action for DE 102020132966.0,, mailed mailed Oct. 1, 2021.
(Continued)

*Primary Examiner* — Joseph A Dillon, Jr.
(74) *Attorney, Agent, or Firm* — Biotech Beach Law PC; Raymond Wagenknecht

(57) ABSTRACT

Transfer device, adapted to take over a conveyed material at a takeover area from an upstream conveying section, convey the conveyed material at least temporarily within a conveying area in a conveying direction and, and selectively transfer the conveyed material in the direction of a transfer area arranged laterally in the conveying direction, the transfer device including a plurality of belt carriages which are arranged circumferentially along a guide in such a way that the belt carriages move at least temporarily, in particular in the conveying area, in the conveying direction, the belt carriage having a transport belt, the transport belt forming at least temporarily a support surface for the conveyed material, and the transport belt being selectively movable in a transverse direction transverse to the conveying direction for selective lateral transfer of the conveyed material.

23 Claims, 13 Drawing Sheets

(56)                References Cited

U.S. PATENT DOCUMENTS

| | | | | |
|---|---|---|---|---|
| 5,127,515 | A | 7/1992 | Damkjaer | |
| 6,186,314 | B1 | 2/2001 | Conklin, Jr. | |
| 7,562,761 | B2 * | 7/2009 | Tasma | B65G 17/067 |
| | | | | 198/370.02 |
| 9,233,803 | B2 * | 1/2016 | Pilarz | B65G 17/345 |
| 9,321,594 | B2 * | 4/2016 | Droste | B65G 17/34 |
| 9,409,716 | B2 * | 8/2016 | Bastian, II | B65G 43/08 |
| 9,809,388 | B2 | 11/2017 | Bastian, II et al. | |
| 10,099,860 | B2 * | 10/2018 | Droste | B65G 17/42 |
| 10,427,875 | B2 * | 10/2019 | Michaeli | B65G 15/08 |
| 11,365,066 | B2 * | 6/2022 | Wang | B65G 23/06 |
| 11,873,166 | B2 * | 1/2024 | Briano | B65G 17/068 |
| 2010/0022358 | A1 * | 1/2010 | Schwaiger | B65G 17/345 |
| | | | | 482/54 |
| 2014/0014468 | A1 * | 1/2014 | Pilarz | B65G 47/96 |
| | | | | 198/370.03 |
| 2015/0360869 | A1 * | 12/2015 | Bastian, II | B65G 43/08 |
| | | | | 198/370.06 |
| 2018/0111700 | A1 | 4/2018 | Kim et al. | |
| 2023/0001453 | A1 * | 1/2023 | Shan | B65G 39/20 |
| 2024/0327127 | A1 * | 10/2024 | Dudek | B65G 23/44 |

FOREIGN PATENT DOCUMENTS

| | | |
|---|---|---|
| DE | 19801706 A1 | 7/1999 |
| DE | 202012004830 U1 | 6/2012 |
| EP | 1153860 A1 | 11/2001 |
| JP | S63-93326 U | 6/1988 |
| WO | 9831614 A1 | 7/1998 |
| WO | 2020025329 A1 | 2/2020 |
| WO | 2020099149 A1 | 5/2020 |

OTHER PUBLICATIONS

International Search Report for PCT/EP2021/084717, mailed Jun. 7, 2022.

* cited by examiner

TRANSFER DEVICE

BACKGROUND OF THE INVENTION

The invention relates to a transfer device.

WO 2020/025329 A1 discloses a crossbelt sorter in the configuration of a horizontal sorter. The crossbelt sorter comprises a plurality of conveyor carriages arranged one behind the other in a direction of travel. Each conveyor carriage includes a crossbelt onto which a conveyed material can be placed. The crossbelt is movable in a transverse direction which is aligned transversely to the direction of travel. For sorting out the conveyed material, the crossbelt is selectively driven, whereby the conveyed material, viewed in the conveying direction, is accelerated laterally and conveyed down from the conveyor carriage (transfer). Such a crossbelt sorter is characterized by its ability to precisely transfer the conveyed material even at high conveying speeds. Such crossbelt sorters are large installations requiring an area of more than 100 square meters.

To feed the conveyed material onto the crossbelt sorter (infeed), a lateral infeeder (so-called infeeds) is usually used, which guides the conveyed material to the crossbelt sorter at an acute angle relative to the conveying direction of the crossbelt sorter. Alternatively, so-called toploaders can be used, which drop the conveyed material from above onto the conveyor carriage.

DE 20 2012 04 830 U1 discloses a crossbelt sorter in the configuration of a vertical sorter. The return of the conveyor carriages takes place in a plane vertically below a conveying plane for the conveyed goods. All conveyed goods applied to the vertical sorter must be transferred laterally before the rear end or are collected at the end in a collecting station. Due to the vertical deflection, it is not possible—unlike with a horizontal sorter—to return the conveyed material to a starting point in a circuit. The conveyor carriages of a vertical sorter are similar in size to those of a horizontal sorter and require large deflection radii.

The conveyor carriages of the crossbelt sorters are dimensioned in such a way that they can completely accommodate a conveyed material. A typical length in the conveying direction is therefore between 50 and 100 cm. Due to the size of the conveyor carriages and the associated deflection radius of the conveyor carriages, the installation of a crossbelt sorter requires a large amount of space. In addition, access to the crossbelt sorter must be widely secured by fences to avoid the risk of injury at the moving carriages.

It is not necessary to provide a high-priced crossbelt sorter to transfer a material in the course of a modular belt conveyor line or a roller conveyor line. The solutions available on the market under the designation "Interroll High Performance Divert 8711" and "Interroll Transfer RM 8731" are suitable for this purpose in order to implement one or more transfer stations following a belt or roller conveyor line or between several such conveyor lines.

With the "Interroll Transfer RM 8731", the material to be conveyed is completely decelerated in the conveying direction during transfer and then accelerated in a transfer direction transverse to the conveying direction.

Both the "Interroll Transfer RM 8731" and the "Interroll High Performance Divert 8711" can only be operated at a conveyor speed that is significantly lower than the conveyor speed of the crossbelt sorter.

The aforementioned solutions can be used modularly in a roller conveyor line or a belt conveyor line. The advantage of such transfer units in contrast to the crossbelt sorter is in particular that the material can be fed onto the transfer unit in the conveying plane. Another roller conveyor line or belt conveyor line can also be arranged immediately downstream of the compact transfer unit in the conveying direction, through which a conveyed material that has not been transferred can simply be transported on to the next station.

BRIEF SUMMARY OF THE INVENTION

It is the object of the present invention to provide an improved transfer device which can be used in particular flexibly with other conveyor lines. In particular, the transfer device should have a performance comparable to that of the crossbelt sorters, but require significantly less installation space and effort, and thus also be significantly less expensive.

The object underlying the invention is solved by a transfer device, a conveyor system and a use according to the main claims. Embodiments are the subject of the subclaims and the description.

The transport belts are designed to provide a support surface for the conveyed material in the conveying direction. The transport belts are also designed to transfer the conveyed material laterally. In addition, the material to be conveyed can rest on the transport belt with a high coefficient of friction. Overall, this results in very high reliability of the lateral transfer even at high conveying speeds.

In one embodiment, the conveying speed in the conveying direction is at least 1.5 m/s, preferably at least 2.0 m/s, further preferably 2.5 m/s.

In this context, the belt carriage refers to the higher-level arrangement comprising the transport belt. In addition to the transport belt, the belt carriage can also comprise belt roller, a belt carriage frame and guide rollers for guiding the belt carriage along the guide. The guide is attached to a frame, in particular a stationary frame.

In contrast to the crossbelt sorters, the transfer device can be arranged, in particular modularly, between an upstream conveyor line and a downstream conveyor line, in which the material to be conveyed is delivered to the conveyor plane and—if not transferred in the transfer device—is handed over again in the conveyor plane to the downstream conveyor line.

The belt carriage itself and/or the transport belt have a comparatively short overall length in the conveying direction. This makes it possible to achieve a very small vertical deflection radius. This small deflection radius in turn favors take over from the upstream conveyor line or hand over to the downstream conveyor line in the conveying direction and in the conveying plane. This in turn is a possible prerequisite for modular integration of the transfer device into cost-effective belt and/or roller conveyor lines.

In a belt conveyor system, a conveyor belt is provided which is mounted in particular on a stationary frame. The conveyor belt is placed around at least two deflection rollers and can be moved in a circulating manner. On the upper side of the conveyor belt, a conveyed material can be moved in a conveying direction.

In a roller conveyor line, a large number of conveyor rollers are provided. In particular, the conveyor rollers are mounted on a stationary frame. The conveyor rollers are at least partially driven by a motor, whereby one or more of the conveyor rollers can be designed as a motor roller. The conveying rollers define with their upper side a conveying plane on which the material to be conveyed comes to rest and is conveyed. During the conveying process, the material to be conveyed always rests on at least two rollers simultaneously.

In one embodiment, the length of the transfer device is max. 10 m, in particular max. 7 m.

The transport belt can be a poly-V belt or a toothed belt in particular. Preferably, an upper run of the transport belt lies slidingly on a flat base on the belt carriage. The use of support rollers can therefore be dispensed with. It must be taken into account that there is usually no relative movement between the belt carriage and the transport belt, but only when a conveyed material is actually to be transferred. The friction that occurs between the conveyed material and the belt carriage is acceptable in this case.

The term "conveying plane" is to be understood broadly and does not necessarily require a mathematically exact flat surface. Rather, the term conveying plane is to be regarded as distinct from falling transitions, as occurs in extreme form in the toploader presented. In this respect, the conveying plane may well have slight height differences, in particular in the range of max. 7 cm, especially max. 4 cm.

The conveying direction and/or the conveying plane can be infinitesimally small at the takeover point or handover point, in particular if the first conveying section or the second conveying section is curved. However, the conveying direction at the transfer point or takeover point has a continuous course in particular.

In one embodiment, the transfer device is adapted for use in which the smallest side length (width) of the conveyed material is max. 120 mm, in particular max. 100 mm, preferably max. 90 mm. Of course, the transfer device can also convey larger conveyed goods. In particular, the transfer device is adapted to convey a conveyed material that has a smallest side length of 120 mm.

Any suitable material to be conveyed is dimensioned in such a way that it comes to rest simultaneously on at least two adjacent transport belts.

Relevant side lengths are understood to be those outer boundaries of the conveyed material that are visible in the top view when the conveyed material rests on the conveying plane with its largest side surface, i.e. in particular flat. The height (also frequently referred to as thickness) of a transport envelope is therefore not to be regarded as a side length in this respect.

In particular, the transport belt is positively drive-connected to a drive wheel. In particular, the transport belt is a toothed belt with elevations on an underside that serve to engage with a toothed wheel as the drive wheel.

BRIEF DESCRIPTION OF THE DRAWINGS

The invention is explained in more detail below with reference to the figures; herein shows:

FIG. 17 a) a section of an embodiment of a belt carriage of the aforementioned type;
b) a schematic cross-section through the belt carriage according to FIG. 16a.

DETAILED DESCRIPTION OF THE INVENTION

Figures 1, 2:
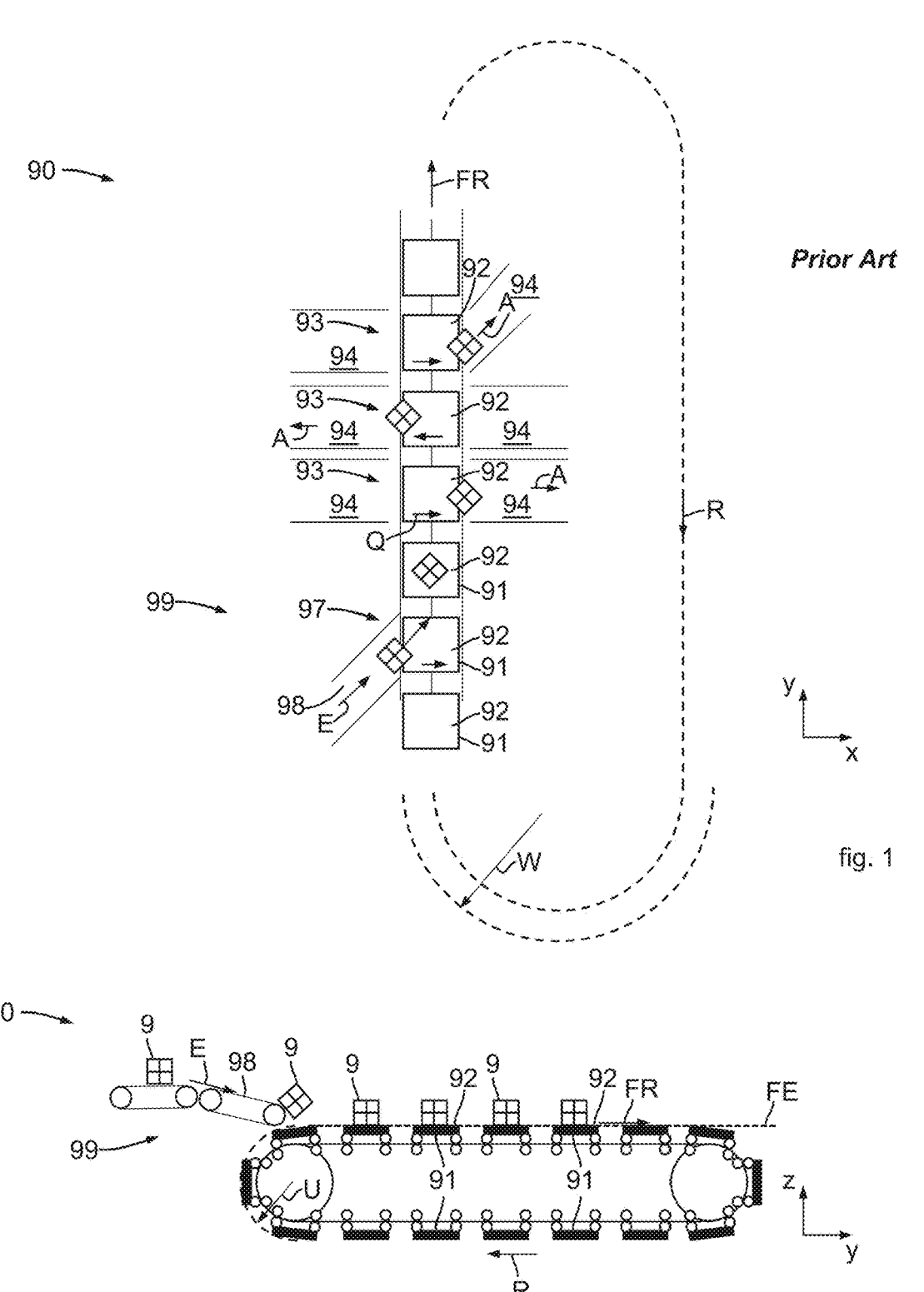
FIG. 1 a section of a conventional crossbelt sorter in the configuration of a horizontal sorter in top view.
FIG. 2 a side view of a conventional crossbelt sorter in the configuration of a vertical sorter.

FIGS. 1 and 2 show embodiments of non-claimed crossbelt sorters 90, comprising a plurality of conveyor carriages 91 which are movable in a conveying direction FR and are arranged one behind the other along the conveying direction. A crossbelt 92 is disposed on top of each of the conveyor carriages 91. An upper side of the crossbelt 92 thereby forms a support surface for a conveyed material 9 and at the same time defines a conveying plane FE. In the intended use, the smallest possible material to be conveyed is placed on a maximum of one carriage 91 and one crossbelt 92. An oversized material can also be conveyed on two or more carriages 91 and crossbelts 92 at the same time. Each carriage has a length in the conveying direction of at least 50 cm.

A plurality of transfer stations 93 are provided, at which the conveyed material 9 can be selectively removed from the conveyor carriage 91 and conveyed to a transfer area 94 provided laterally of the conveyor carriage 91. For this purpose, the crossbelt 92 is set in motion on the conveyor carriage 91, whereby the conveyed material is accelerated and finally moved transversely to the conveying direction FR.

An infeed area 99 is provided for placing the conveyed material 9 on one of the carriages 91. The material to be conveyed 9 is initially provided on an infeed conveyor line 98, on which the material to be conveyed 9 is moved along an infeed direction E towards the conveyor carriage 91.

In the embodiment according to FIG. 1, the infeed direction E is arranged at an acute angle of approximately between 30° and 60° to the conveying direction FR when viewed from above, whereby the infeed direction E can lie in the conveying plane FE. The two directions E, FR meet at a junction 97 (also referred to as "merge"). At the junction 95, the conveyed material is handed over from the infeed conveyor line 98 to the conveyor carriage 91. To pick up the conveyed material at the conveyor carriage, the crossbelt can be moved in a transverse direction Q (to the right or to the left) which is transverse to the conveying direction.

In the configuration shown in FIG. 1, the infeed direction E can be exactly aligned with the conveying direction FR when viewed from above. However, it is then necessary to arrange the infeed conveyor line 98 above the conveyor carriage 91. The material to be conveyed is then transferred onto the conveyor carriage 91 from a plane above the conveying plane FE. Such an infeed section is also referred to as a "top loader" and is shown in FIG. 2.

The conventional crossbelt sorters, neither in the configuration as horizontal sorters nor in the configuration as vertical sorters, are able to take over a conveyed material from such a conveyor line 98, which brings the conveyed material both in the conveying direction FR and in the conveying plane FE of the crossbelt sorter to the takeover area. Nor is it possible to handover the conveyed material from the crossbelt sorter to a downstream conveyor line in which the conveyed material is taken over both in the conveying direction FR and in the conveying plane FE of the crossbelt sorter at the handover area.

The large conveyor carriages of the crossbelt sorter moving in a circuit always require a large installation space, in particular in order to deflect the conveyor carriage and return it to the infeed area 99 on a return path R. In the case of a vertical sorter (FIG. 2), a deflection radius U at the surface of the crossbelt is about 1 m. Due to the resulting large gap length, a roller conveyor or a belt conveyor cannot be connected directly upstream or downstream in the conveying direction FR. In the case of a horizontal sorter (FIG. 1), a turning radius is greater than 1.5 m.

Figure 3:
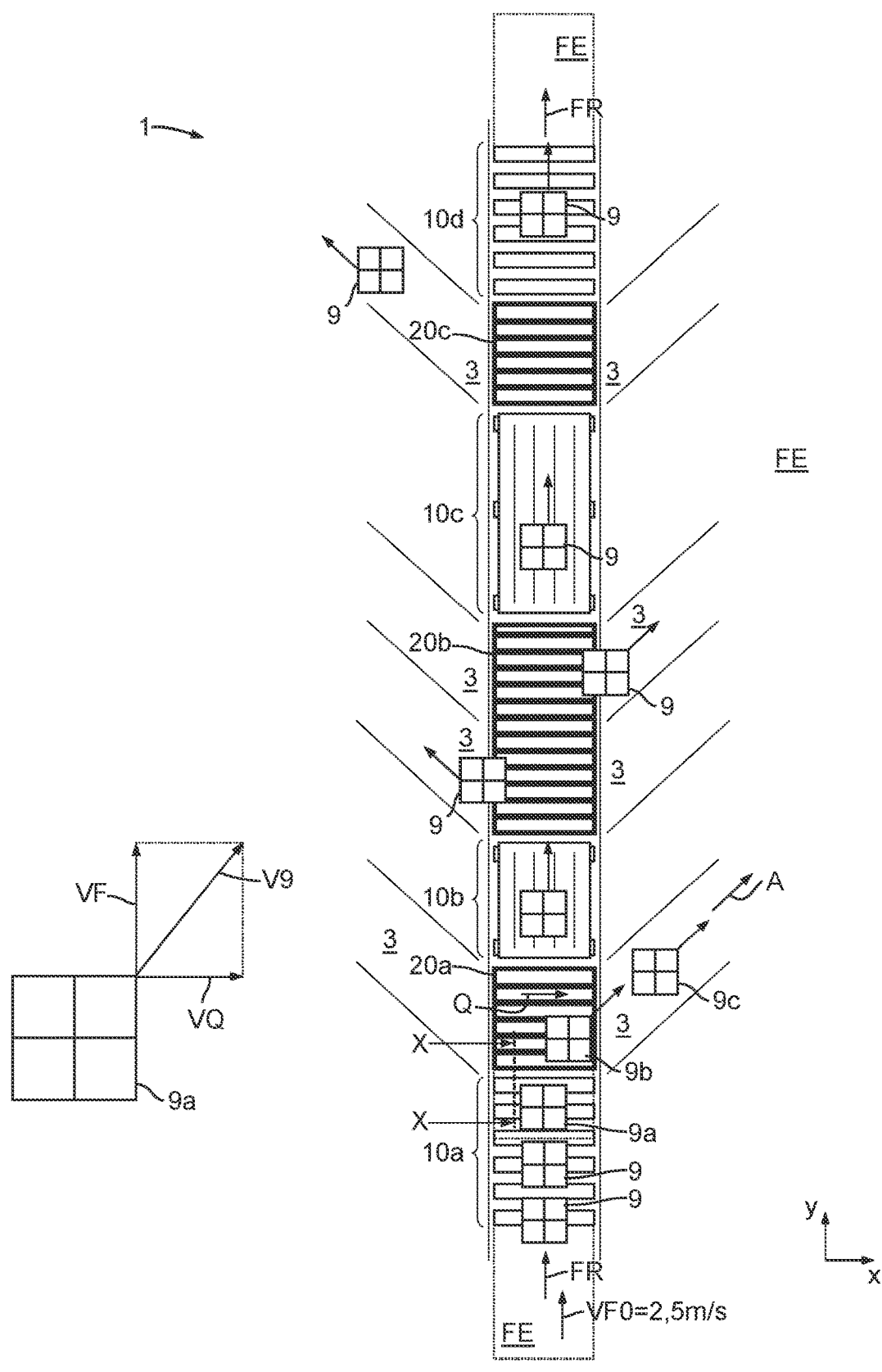
FIG. 3 a top view of a conveyor system according to the invention.

FIG. 3 shows a conveyor system 1 with sorting function according to the invention. Several devices 10, 20 for conveying conveyed goods 9 are arranged one behind the other in a conveying direction FR. The conveyed goods 9 are first fed via a conveyor line 10*a*. Subsequently these are then handed over to a first transfer device 20*a*. This is followed by further conveyor lines 10*b*, 10*c* and further transfer devices 20*b*, 20*c*, the transfer devices 20 being arranged between two conveyor lines 10. The conveyor lines can be of any design as roller conveyor lines 10*a*, 10*d* or as belt conveyor lines 10*b*, 10*c*.

The transfer device 20 can selectively divert selected conveyed goods 9 from the conveying direction FR and convey them into a transfer area 3 arranged laterally to the conveying direction FR, which is laterally offset to the transfer device 20 in the conveying direction FR. For this purpose, the conveyed material 9 is accelerated in the transverse direction Q, at least for a short time.

The conveyor line 10 can be a roller conveyor or a belt conveyor that is adapted to convey the material 9 along the predefined conveying direction FR. The conveying direction FR can also have a curved course, e.g. in the case of a belt curve or a roller curve. It is significant here that the conveyor system 1 forms a continuous conveying plane FE from the first conveying section 10*a* to the fourth conveying section via the transfer devices 20.

The transfer device 20 could basically be implemented in a conventional conveyor system by the "Interroll High Performance Divert 8711" or "Interroll Transfer RM 8731" described at the beginning. In the context of the present invention, the transfer device 20 is designed as described below.

FIGS. 5 to 10 show details of an transfer device 20 according to the invention and are described together below.

Figure 5:
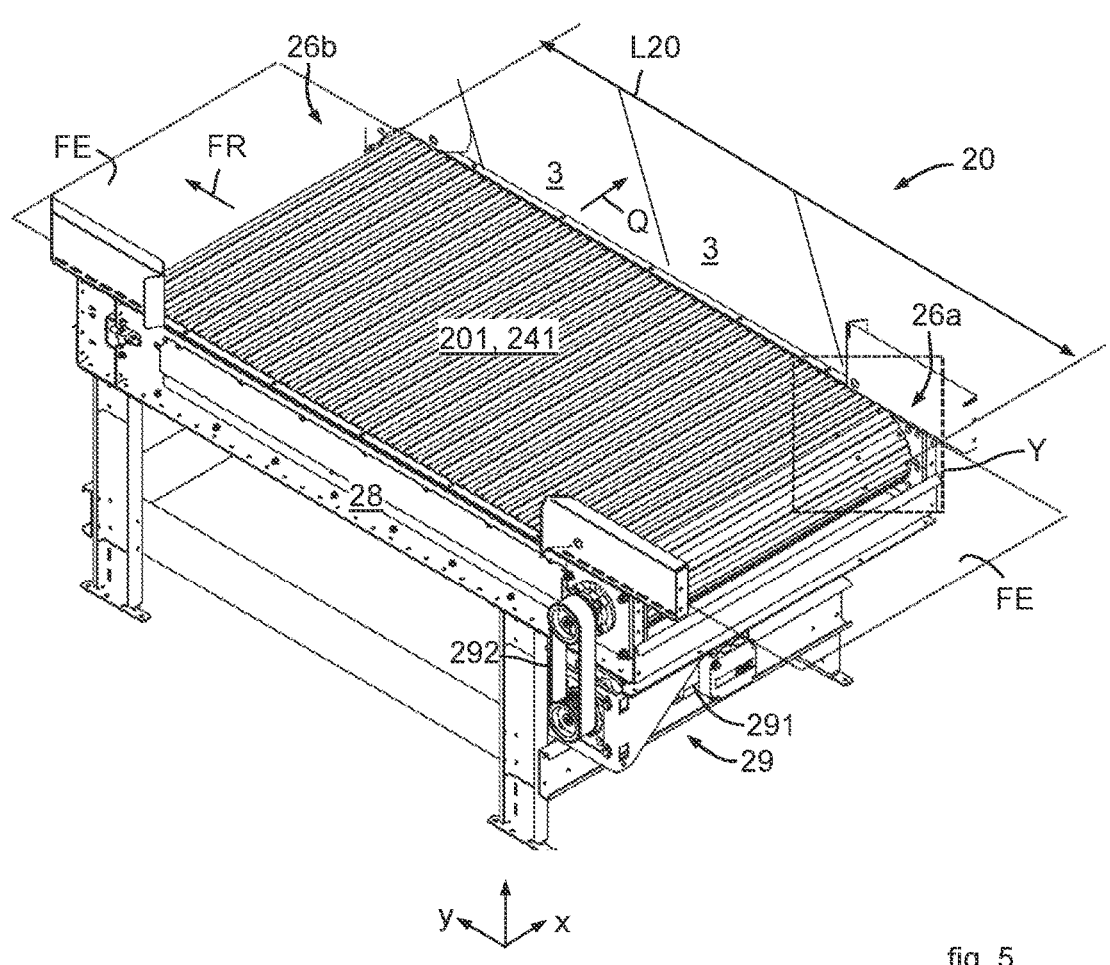
FIG. 5 a perspective view of the transfer device of the conveyor system according to FIG. 3.

The transfer device 20 comprises a frame 28 with, for example, four feet (FIG. 5). The transfer device 20 forms a conveying surface 201 on which material 9 can be conveyed in the conveying direction FR. The conveying surface 201 defines the conveying plane FE. The transfer device 20 comprises a guide 23 along which a plurality of belt carriages 21 are arranged. The belt carriages 21 are movably arranged on the guide 23 in such a way that the belt carriages

21 are moved in a circuit. At the first side, here the upper side, the belt carriages move in the conveying direction FR. At a takeover location 26*a*, the conveyed material 9 is taken over from the upstream conveyor line 10*a* and arranged on an upper side of the belt carriage 21. At a handover area 26*b*, the conveyed material 9 is handed over to a downstream conveyor line 10*c* and arranged on an upper side of the belt carriage 21, provided it has not previously been transferred laterally.

Each belt carriage 21 carries a transport belt 24 whose longitudinal extension is aligned in the transverse direction Q (see FIG. 3). The transport belt 24 protrudes above the belt carriage 21 and thus constitutes a support surface 241 which defines the conveying plane FE and on which the resting conveyed material 9 comes to rest. Since the entire belt carriage 21 together with the conveyed material 9 moves at the basic speed v0, there is no significant inertia-related force transmission between the transport belt 24 and the conveyed material 9 at the transport belt 24.

The belt carriage is driven in the conveying direction by a drive 29. The drive can comprise a motor 291 and a separate gear unit 292 (FIG. 5). Alternatively, the drive can be designed as a drum motor 29 (FIG. 6).

Figure 6:
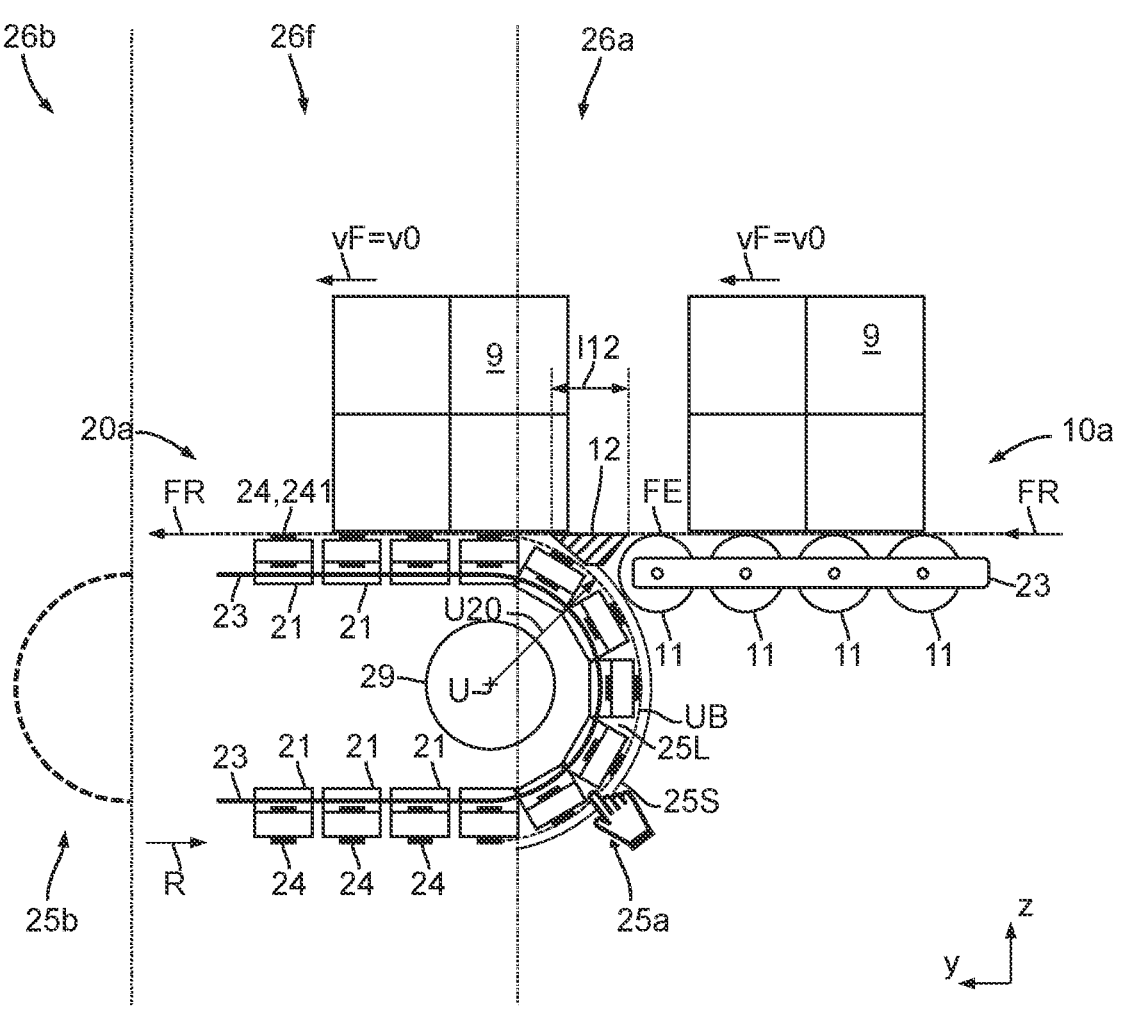
FIG. 6 a schematic cross-section through the transfer device along the line of intersection X-X in FIG. 3.

The conveyed material 9 is thus conveyed by the belt carriage 21 in the conveying direction FR (FIG. 6). During transport, individual conveyed goods 9 can be selectively transferred laterally. Conveyed goods 9 that are not transferred reach the handover area 26*b*, which is followed by the downstream conveyor line 10*b*. The materials 9 not transferred are handed over here to the downstream conveyor line 20*b*. At a rear deflection area 25*b*, the belt carriages are deflected, in this case downward, and thus subsequently reach a front deflection area 25*a* along a return path R. The belt carriages are then transferred to the rear deflection area 25*b*. At the front deflection area 25*a*, the belt carriages 21 are deflected upward and thus return to the takeover area 26*a*, where a conveyed material 9 can be picked up again.

The area after the takeover area 26*a* and before the handover area 26*b* is referred to as the conveying area 26*f*. Here, the conveyed material 9 is in contact with the belt carriage 21. The conveyed material 9, which is used with the conveyor system as intended, is at least of such large dimensions that, provided it is arranged completely in the conveying area 26*f*, it rests on at least two belt carriages 21, in particular comes into contact with the transport belt of two adjacent belt carriages. A smaller conveyed material cannot be reliably conveyed, since it can get into the spaces between two adjacent transport belts 24; reliable transfer would not be ensured in this case.

The special feature is that at the takeover location 26*a* the conveyed material 9 is continuously taken over from the upstream conveyor line 10*a* in the conveying direction FR. This means in particular that both in the transfer device 20*a* and in the upstream conveyor line 10*a* the conveyed material is guided in the same conveying direction FE both in top view and in side view and is conveyed both on the upstream conveyor line and subsequently in the transfer device 20 of a common conveying plane FE. Such a takeover or handover is not possible with conventional cross-belt sorters.

In the deflection area 25, the belt carriage 21 is displaced downward in each case. During the deflection in the deflection area, the support surface 241 travels along a downwardly curved orbital path UB (FIG. 6). The orbital path has, at least in sections, a deflection radius U20 about a deflection axis U of 110 mm, for example. The small deflection radius enables the continuous takeover/handover of the conveyed material in the conveying direction FR and conveying plane FE.

In the area radially inwards between the belt carriages, a drum motor 29 can be provided as a drive unit (as an alternative to the illustration in FIG. 5). The drum motor can be designed as an integral unit comprising an electric motor and a gear unit.

A gap in the conveying plane FE between the first conveyor line 10a and the transfer device 20 can be covered by a passive gap bridge 12 (FIG. 6). The passive gap bridge 12 provides a supporting surface without the presence of conveyor rollers or other conveyor elements. The maximum length 112 in the conveying direction FR of the gap bridge 12 depends on the minimum size of the conveyed material 9. It must always be ensured that the conveyed material rests on at least one moving conveying element (e.g. roller 11, belt carriage, 21, transport belt 24) in order to be moved continuously in the conveying direction FR. In an alternative embodiment, the gap bridge can be actively designed. In this case, there is a small conveyor unit in the gap, which comprises, for example, several poly-V belts arranged in parallel. These belts can then be moved in the conveying direction and apply a driving force to the material conveyed in the gap.

Figure 7:
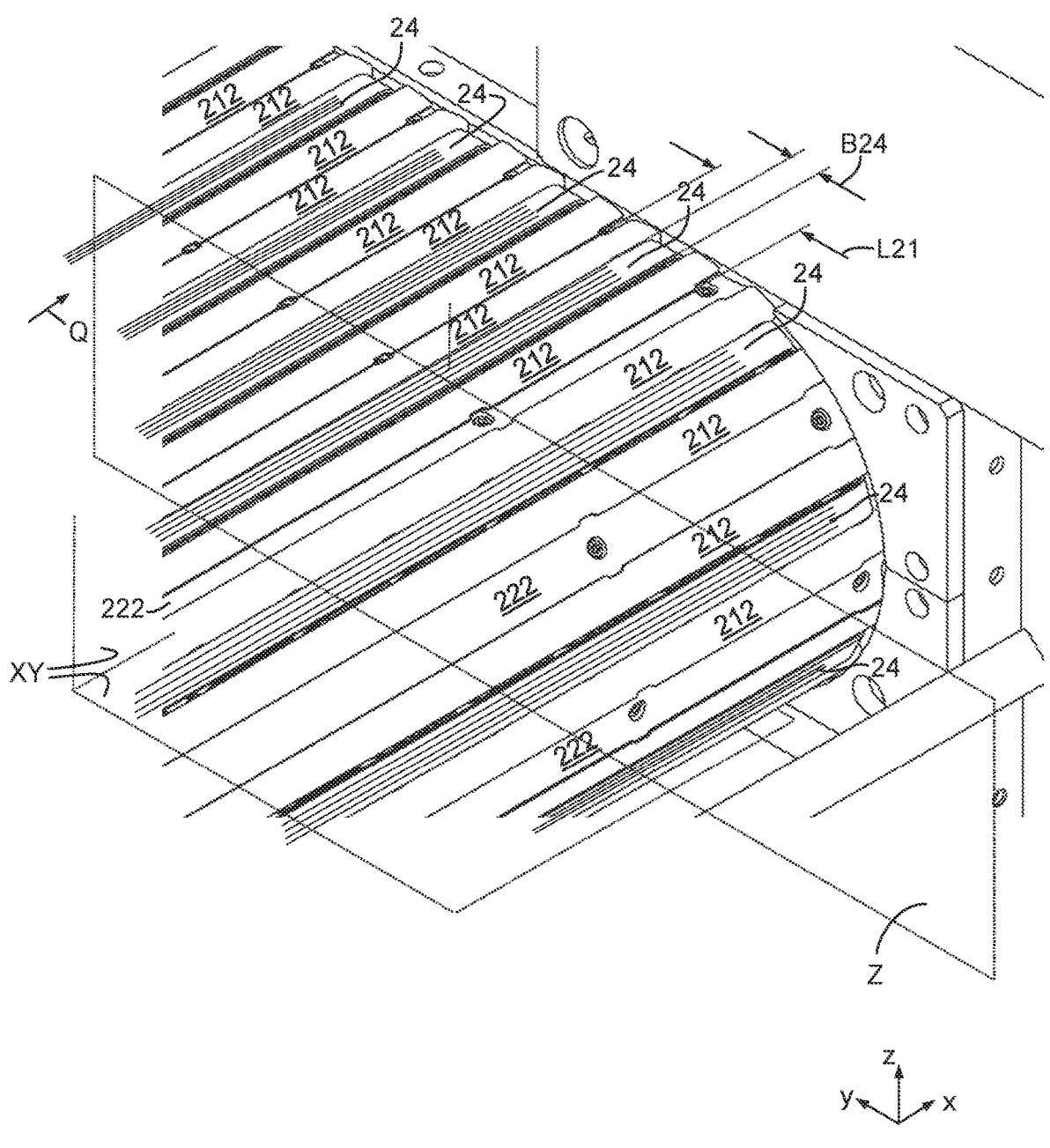
FIG. 7 an enlargement of the section Y from FIG. 5.
Figure 8:
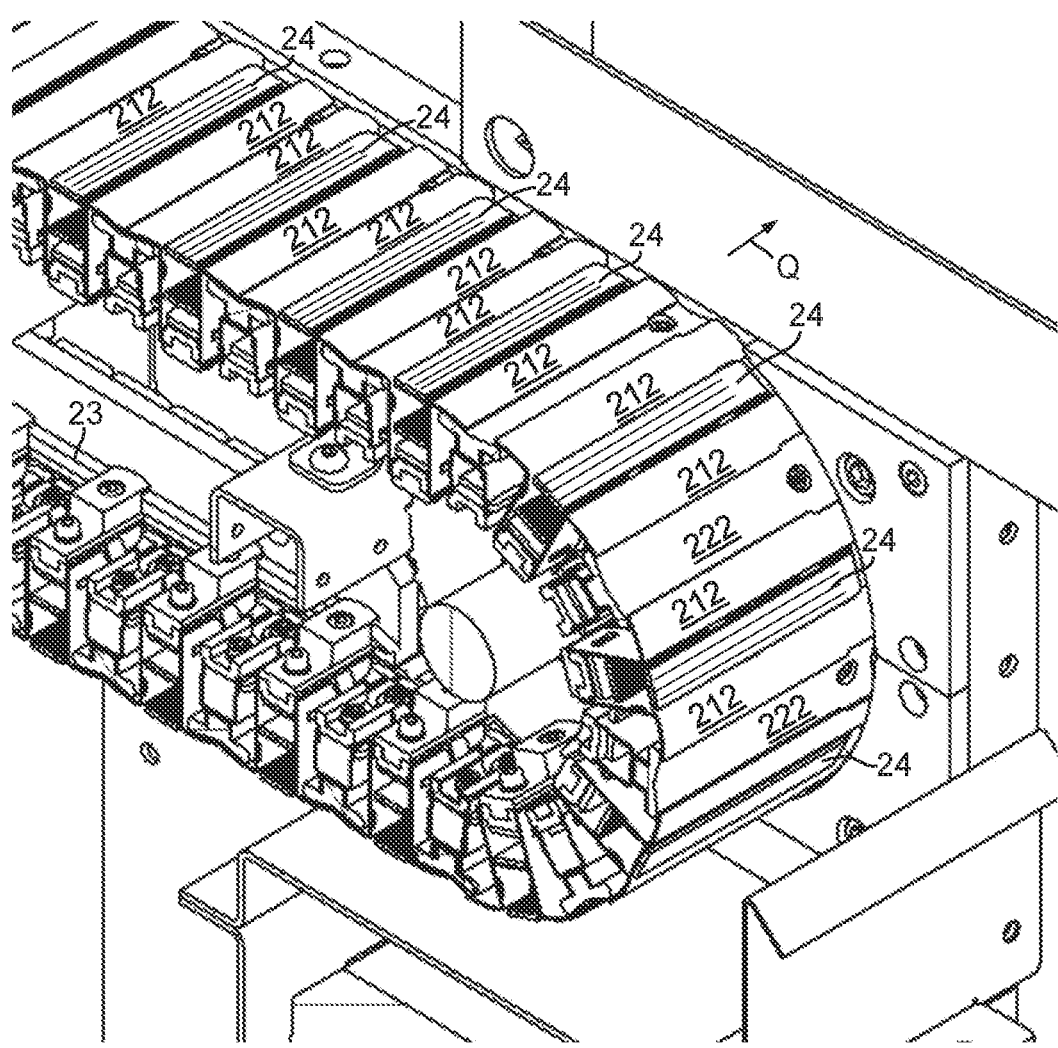
FIG. 8 a section along the section plane Z of FIG. 7.

In the conveying area 26f, two successive belt carriages 21 can be so close to each other that a gap size of a gap between two adjacent belt carriages 21 is within a predetermined maximum value. In particular, the maximum value is so small that no finger can enter the gap. In the deflection area 25a, 25b, the gap between the adjacent belt carriages 21 inevitably increases due to the curved path, so that an increased circumferential gap 25L could result here, into which a user can get his fingers (see schematically shown hand in FIG. 6). To prevent the risk of injury in this area, an intermediate surface 222 is provided which closes the circumferential gap 25L. FIGS. 7 and 8 show the function of the intermediate surface 222.

The intermediate surface 222 can in particular prevent a flat conveyed material (see FIG. 11) from entering a gap between the belt carriages. Such an entering is particularly possible in the takeover area 26a (see FIG. 6), since here the conveyed material hits the support surface 241 for the first time and at the same time a gap between two carriages can be particularly large due to the deflection of the carriages.

A protective cover 25S can be provided in the deflection area 25a, which is arranged radially outside the belt carriage 21 in the deflection area 25. This acts like a mudguard around a bicycle wheel and can prevent unintentional engagement in the circumferential gap.

Figure 9:
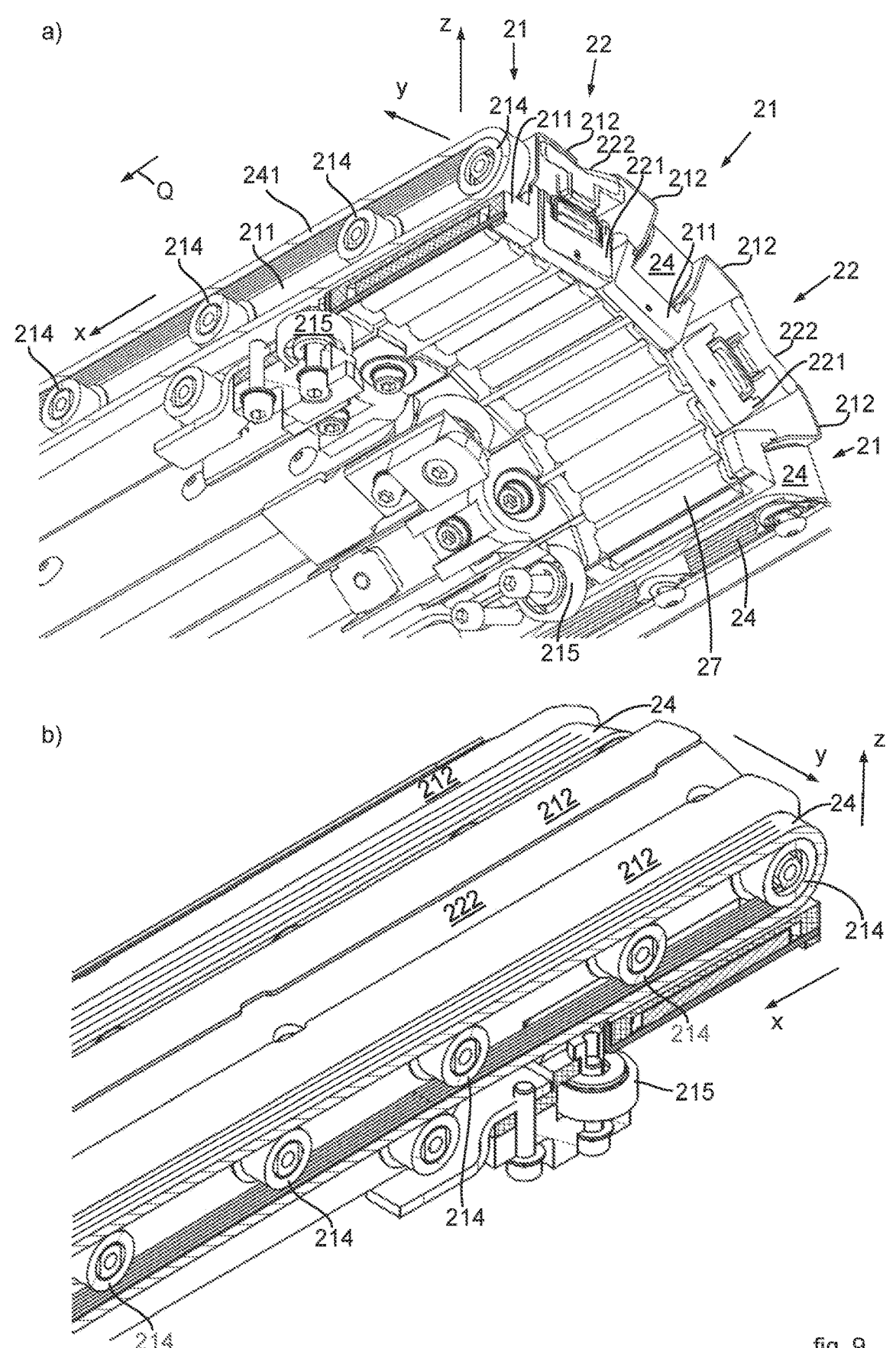
FIG. 9 a perspective sectional view along the bent sectional plane XY of FIG. 7.

The belt carriage 21 forms a closed surface with the support surface by the transport belt as well as laterally adjacent guide surfaces (FIGS. 7, 8, 9). The guide surfaces 212 are statically fixed to a belt carriage frame 211 of the belt carriage (FIG. 9). In the conveying area, the guide surfaces 212 of adjacent belt carriages 21 lie against each other to form a closed surface. In the deflection area 25, the aforementioned circumferential gap is formed between the guide surfaces 212 of adjacent belt carriages 21, which is directly closed by the intermediate surface 222 appearing in the circumferential gap.

The intermediate surface 222 may be part of an optional intermediate carriage 22 disposed between two adjacent belt carriages 21 (FIG. 9). The intermediate surface 222 is supported on an intermediate carriage frame 221 of the intermediate carriage. The intermediate carriage 22 may itself have rollers so that the intermediate carriage can be guided on a guide 23 of the transfer device 20. Alternatively, it is also possible for the intermediate carriage frame 221 to be supported on one or both of the adjacent belt carriages.

FIG. 8 shows the intermediate surface 222 and the guide surface 212 on the belt carriage 21 in longitudinal section. The intermediate surface 222 has an upwardly directed concave shape. The guide surface 212 covers the intermediate surface 222, in particular half of it, when the carriages are outside the deflection area.

In particular, a kind of trough is formed on the intermediate surface, against the side wall of which the guide surfaces 212 rest in the conveying area. The guide surface 212 has a downwardly directed surface on its underside, which is in contact with the intermediate surface. In the deflection area, the guide surface 212 slides along the intermediate surface to the outer end thereof, thereby releasing the intermediate surface 222 from the guide surface 212. In particular, the guide surfaces 212 are downwardly inclined to engage the concave "trough" of the intermediate surface in the guide area.

A length L20 of the transfer device is about 3 to 5 m. The length is taken to be the length of the conveying area. Any add-on parts can be disregarded.

Driving the transport belt 24 in the transverse direction Q can basically be carried out as described in DE 1 98 017 06 A1. Based on FIG. 10, a modification to this according to the invention is described.

The transport belt 24 includes an upper run 240 and a lower run 24u. The upper run 240 forms the support surface 241. The lower run 24u is frictionally drive-connected to a drive pulley 312. By rotating the drive pulley 312, the transport belt 24 is set in motion in such a way that the support surface 241 moves in the transverse direction Q. The transport belt 24 is driven by the drive pulley 312.

The drive pulley 312 is drivingly connected to a driven pulley 311, wherein the drive pulley 312 and the driven pulley 311 are arranged coaxially on a common drive axis A312. Any interposition of a gearbox is not required. The driven pulley 311 and the drive pulley 312 move together with the belt carriage in the conveying direction FR. The driven pulley 311 and the drive pulley 312 are connected to each other in a rotationally fixed manner; here exemplarily by means of a shaft connection 315. The driven pulley can also be integrally connected to the drive pulley.

The driven pulley 311 is selectively driven by stationary control flaps 313, as already known from DE 198 01 706 A1. The control flaps 313 can selectively be switched to a drive state (the right flap in FIG. 10) or an idle state (the left flap in FIG. 10) by means of a flap actuator 314. The driven pulley 311 passes the stationary control flap 313 together with the transport belt in the conveying direction FR. If the control flap 313 is in the drive state, a drive torque is transmitted from the control flap to the driven pulley 311. The drive torque is used to drive the transport belt. To transmit the drive torque from the control flap 313 to the driven pulley 311, the axis of the drive wheel must be aligned transverse to the conveying direction FR.

The drive wheel and the driven wheel can be dimensioned in such a way that a slip at the frictional connections between the control flap 313 and the driven pulley 311 or between the drive pulley 312 and the transport belt 24 and an associated loss of speed is compensated by an increased transmission ratio.

The lower run 24u is twisted relative to the upper run 240, in particular by 90°. Thus, it is possible for the drive pulley 312 to be coaxially aligned with the driven pulley 311 and at the same time be in power-transmitting connection with the lower run 24z. A bevel gear as in DE 19801706 A1 thus becomes obsolete. The twisting of the lower run is only made possible by the small width of the transport belt. In addition, a bevel gear would have to be very small to fit in the present embodiment.

Different belt rollers 214 are provided for guiding the transport belt. First belt rollers 214a are provided to guide the upper run 240 in such a way that it can form the bearing surface 241, which is arranged in the conveying plane FE. Second belt rollers 214b are provided to guide the lower run in such a way that the latter is in force-transmitting contact with the drive wheel and, in particular, is looped in sections around the drive pulley 312. The axis of rotation of the first belt roller 214a and the axis of rotation A312 of the drive shaft are aligned transversely to one another.

Figure 4:
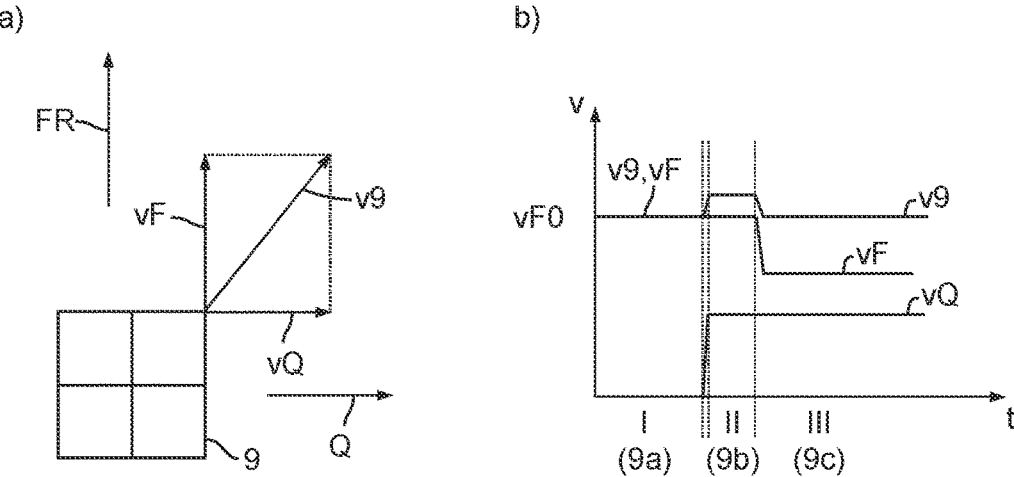
FIG. 4 schematically shows a speed profile of a conveyed material during transfer in the conveyor system according to FIG. 3.

FIG. 4a shows the conveyed material 9 with schematic velocity vectors during its conveying process on the transfer device 20. vF denotes the velocity in the conveying direction FR; vQ denotes the velocity of the conveyed material 9 in the transverse direction Q; v9 denotes the absolute velocity as the result of a vector addition of the aforementioned partial velocities vF, vQ.

FIG. 4b shows a diagram of the speeds vF, vQ, v9 during a transfer process of the conveyed material on the transfer device according to the invention. In a first phase I, the material to be conveyed 9 is conveyed on the belt carriage in the conveying direction FR. The absolute speed v9 corresponds to the speed vF in the conveying direction, which is predetermined by the movement of the belt carriage in the conveying direction.

In a second phase II, the transport belt is driven, whereby the conveyed material is also moved in the transverse direction at a speed vQ. Vector addition results in an absolute velocity v9 that is greater than the velocity vF in the conveying direction.

In a third phase III, the conveyed material 9 has left the conveyor line and is no longer moved in the conveying direction by the belt carriage. Compared to the second phase II, the material is conveyed further at a lower absolute speed v9. The speeds vF and vQ depend on the orientation of the transfer area 94.

Figure 10:
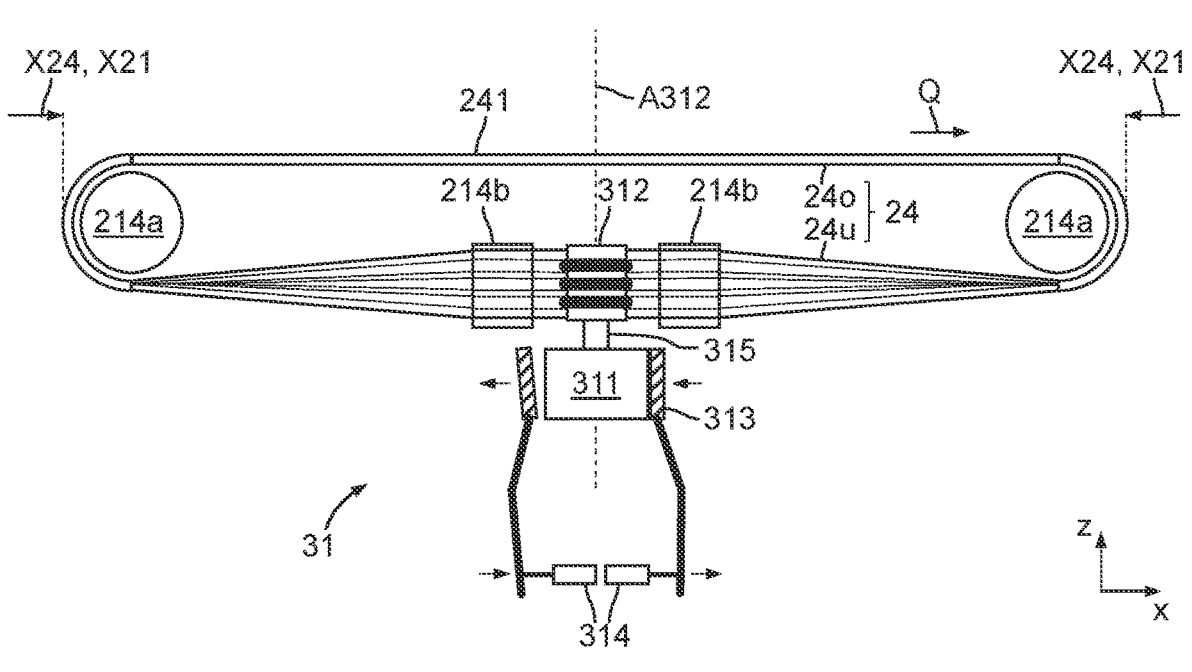
FIG. 10 the transport belt and a belt drive for driving the transport belt,
a) in frontal view,
b) partially the lower run in top view.
Figure 10:
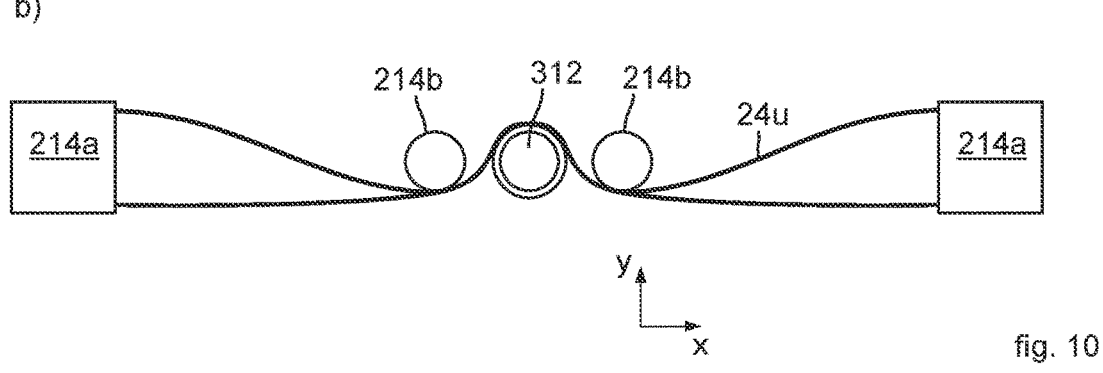

A width B24 of the transport belt in the conveying direction FR is in particular 16 mm (FIG. 7). A length L21 of the belt carriage in the conveying direction is in particular 50 mm (FIG. 7). An extension X21 of the belt carriage in the transverse direction is in particular 1,000 mm (FIG. 10). An extension X24 of the transport belt in the transverse direction is in particular 1,000 mm (FIG. 10).

Figure 11:
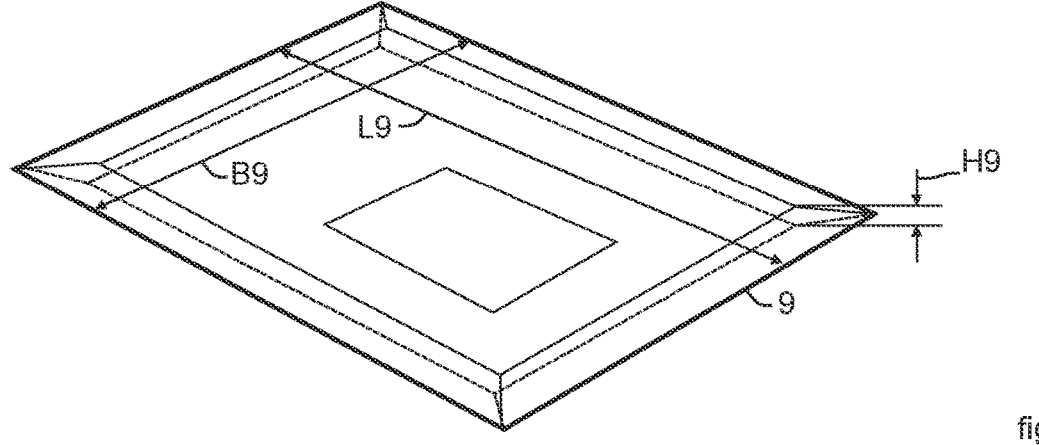
FIG. 11 a conveyed product in the form of a transport envelope suitable for the intended use.

FIG. 11 shows the smallest possible conveyed material 9, which in one embodiment is conveyed as intended and transferred as required with the transfer device according to the invention. The conveyed material 9 is approached in such a way that the height H9 of the conveyed material projects vertically upwards as the smallest extension.

The height H9 can be as small as desired. In particular, in the case of a transport envelope, the height may be a few millimeters, in particular less than 10 mm. The length L9 as well as the width B9 of the conveyed material are referred to in the context of the application as the side length, which is relevant in the following. The height H9 is not a relevant side length, since this is irrelevant for the supporting surface.

The width B9 represents the smaller of the side lengths; the length L9 is the larger of the side lengths. Even in an extreme example, the width B9 is not smaller than the height H9 and not larger than the length L9. In an extreme case, the width B9 could be equal to the length L9 and the height H9, then the conveyed material would be a cube, for example, and the following condition would also apply.

The conveyed material 9 is approached in such a way that it comes to rest on the conveying plane with that surface which is spanned by the two side lengths L9, B9. This is therefore the largest side surface. If the material to be conveyed comes to rest on one of the other smaller side surfaces, the material is usually tipped over at the latest when it passes onto the transfer device so that the material with the largest side surface rests on the conveying plane.

The dimension of the base area is decisive in assessing whether the material to be conveyed can be reliably conveyed or transferred. If the material to be conveyed has a "smallest" side length/width B9 that is too small, there is a risk that it will not be able to come to rest reliably on two transport belts 24 at the same time, and will therefore come to rest with friction on the transversely immovable guide surface 212 (FIG. 8). In this case, reliable transfer is not possible.

An exemplary conveyed material for the use of the transfer device has a smallest side length B9 of 120 mm and a height of 4 mm.

FIG. 12a shows schematic details of an embodiment of the aforementioned transfer device in a normal operating state. A carriage 21, 22 is shown, whereby this can optionally be the belt carriage 21 or the intermediate carriage 22. In this respect, the embodiment is also applicable to both types of carriage. The carriage has guide rollers 231, which are supported on support surfaces 281 of the frame. A reverse embodiment is also conceivable, in which guide surfaces of the carriage are supported on guide rollers of the frame. In addition, sliding elements can also be provided instead of guide rollers. In summary, this refers to a main guide 231, 281 of the carriage 21, 22 relative to the frame 28. The entire load force FL of a load is supported via the main guide 231, 281.

For example, one requirement for the stability of the transfer device is, in particular, that a person standing on the conveying surface must be supported, for example for maintenance purposes.

Since the carriage is a moving part, it should be as light as possible. In addition, as explained above, a significant advantage is the small size of the carriage. This results in a conflict of objectives that must be resolved.

It should also be borne in mind that the greatest possible roller spacing in the X direction is desirable for good directional stability; at the same time, the number of rollers should be as small as possible in order to keep noise, friction and costs to a minimum.

FIG. 12b shows the illustration from FIG. 12a in a special state in which, for example, a person steps onto the transfer device with his feet, for example on the support surface 241 of the transport belt 24, on the guide surface 212 of the belt carriage frame or on the intermediate surface 222 of the intermediate carriage 22. In this case, a weight load of 100 kg and more can occur at points.

The carriages 21, 22 have an auxiliary guide 232, 282 for this purpose. The auxiliary guide comprises an auxiliary support 232 and an auxiliary surface 282. The auxiliary support 232 may comprise a roller 232a or a static support element 232b, for example a sliding block. It can be seen that the auxiliary support is arranged to enter a load-supporting state only when the load applied to the carriage reaches a certain value (special state according to FIG. 12b). In the load-supporting state, the auxiliary support provides a supporting force FS. Now the auxiliary support 232 comes into contact with the auxiliary surface 282. This is caused by a specific elasticity within the carriage 21, 22.

Figure 12:
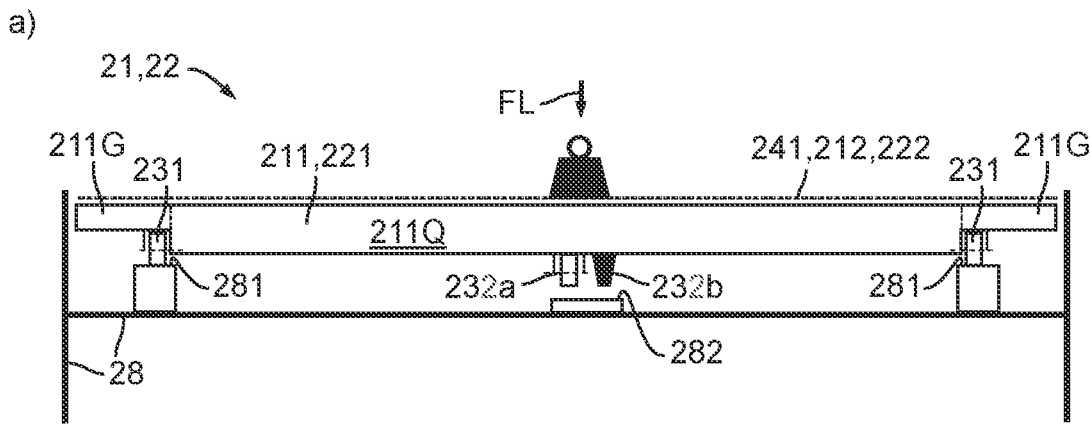
FIG. 12 schematic front view of the carriage design
a) in the normally loaded condition,
b) in the overloaded condition.
Figure 12:
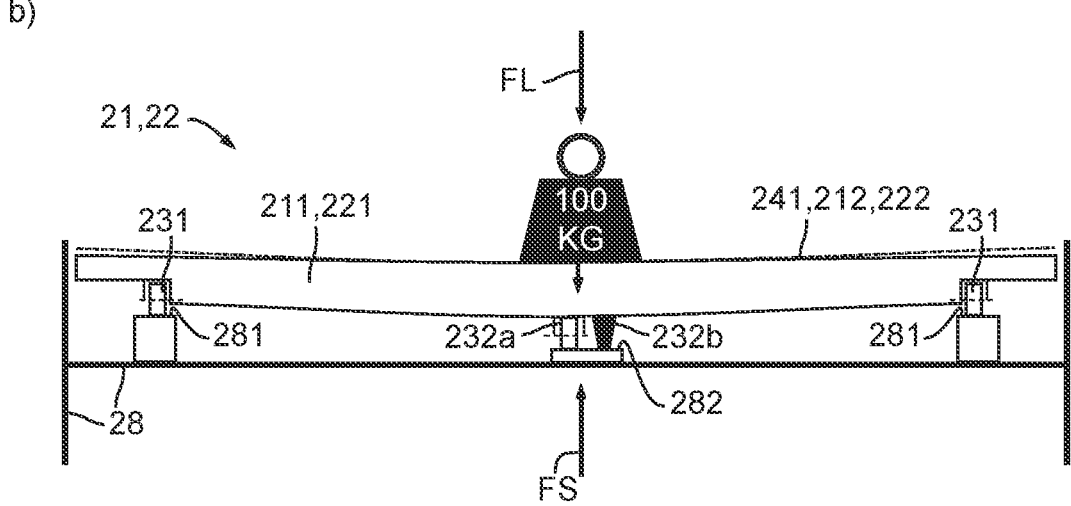
Figure 12:
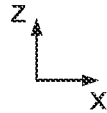

In the embodiment shown in FIG. 12, the carriage frame 211, 221 is the element that provides the required elasticity by being bendable.

Figure 13:
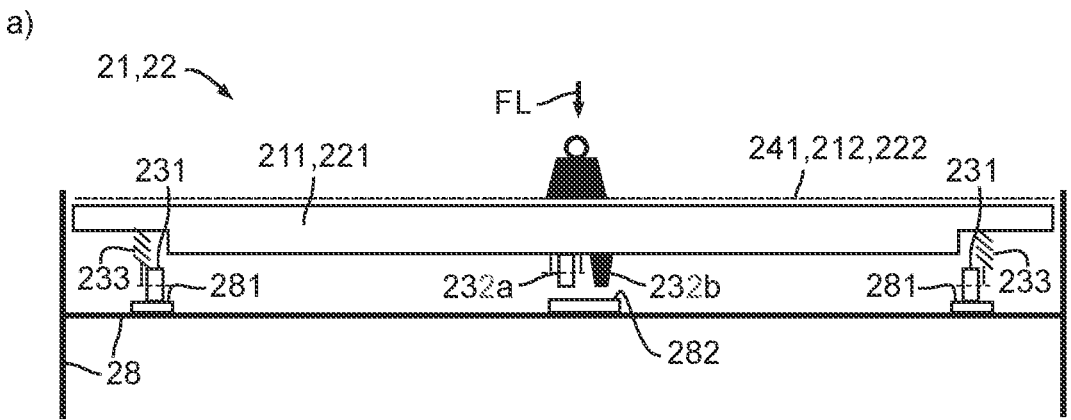
FIG. 13 schematically a front view of the carriage
a) in the normally loaded condition,
b) in the overloaded condition.
Figure 13:
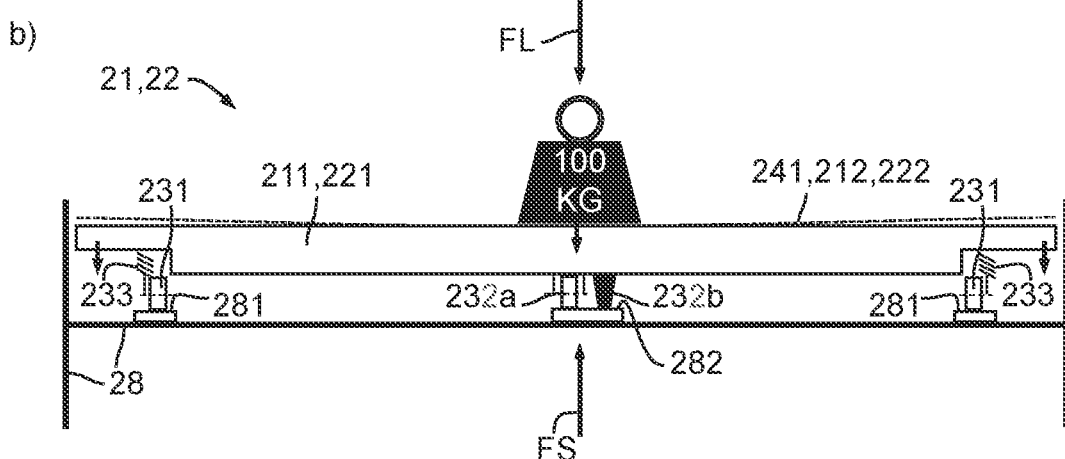
Figure 13:

FIG. 13 shows a variation. Here, the carriage 21, 22 has a spring element 233 by means of which the rollers of the main guide 231 are held elastically on the carriage frame 211, 221. In the event of an overload, the entire carriage frame is then moved vertically downward (FIG. 13*b*) until the auxiliary guide 232, 282 moves into the load-supporting state. In this case, the spring elements 233 are elastically deformed due to the overload.

Figure 14:
FIG. 14 a sectional cross-section through a further design of the carriages in the transfer device according to FIG. 5.
Figure 14:
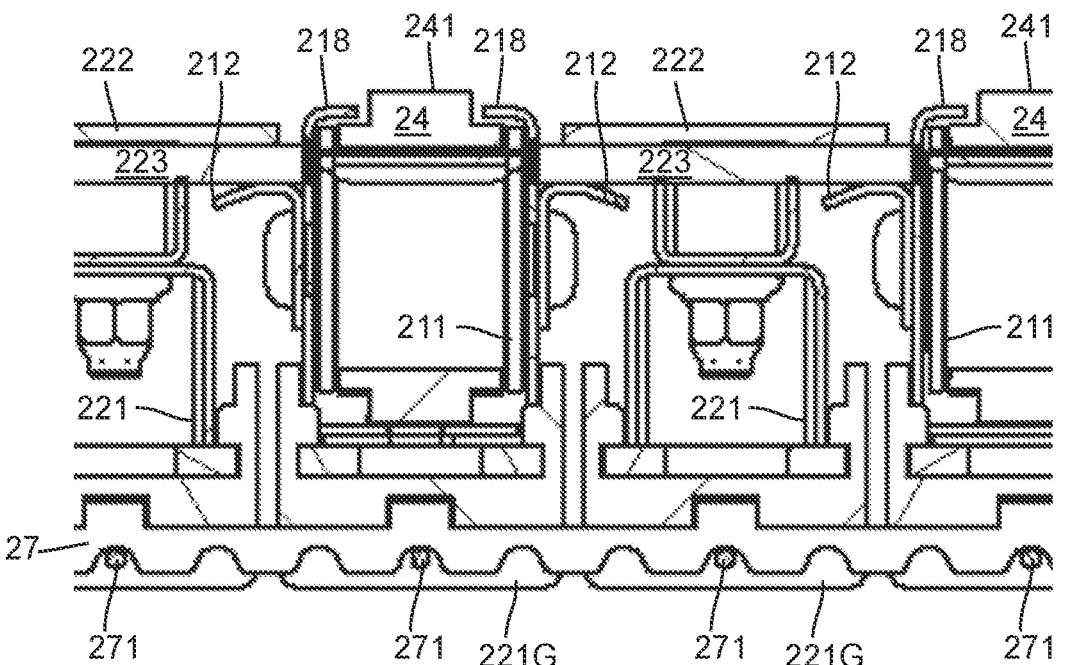
Figure 14:
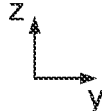
Figures 15, 16:
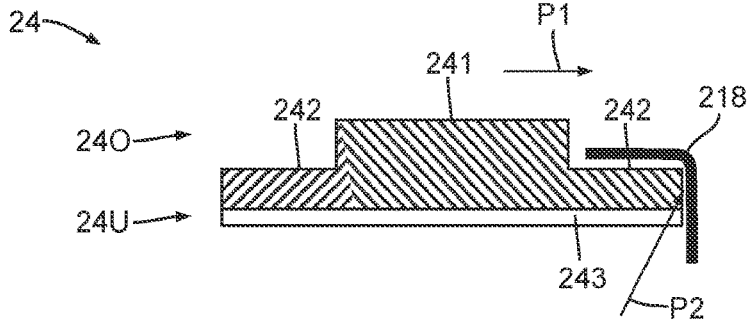
FIG. 15 another cross-section through the carriages according to FIG. 14 on a smaller scale.
FIG. 16 a cross section through the transport belt 24.

FIGS. 14 and 15 show a cross-sectional embodiment of the carriages, which differ from the carriages as shown in FIGS. 7 to 9. In the following, only the differences will be discussed. In this respect, the description of the other features and the mode of operation is also applicable to the present embodiment.

For ease of illustration, FIG. 16 includes an enlarged view of the cross-section of the transport belt 24.

The transport belt 24 has a stepped configuration on an upper surface 240 that forms the support surface 241. Thus, a central portion of the upper surface 240 forms the support surface 241. To the left and right of this, a respective holding surface 242 is formed. The support surface 241 protrudes upwardly from the retaining surface 242. The holding surface 242 and the supporting surface 241 are aligned parallel to each other in the longitudinal direction of the transport belt 24 (=transverse direction Q, see FIG. 7).

The transport belt 24 has downwardly projecting drive projections 243 at regular intervals on an lower side 24U. In this respect, the transport belt 24 is in particular a toothed belt. The transport belt 24 is connected to the drive pulley 312 (see FIG. 10) via a positive drive connection. The drive pulley 312 is designed as a toothed wheel for this purpose. Due to the positive drive connection, the tension of the transport belt can be kept low. This has a favorable effect on friction and dynamics (rapid acceleration of the belt).

The transfer device is operated at a comparatively high conveying speed. In addition, the deflection radius U20 (see FIG. 6) is comparatively small. This leads to high centrifugal forces C in the deflection area 52*a*, 25*b* (FIG. 15), which act on the carriage 21, 22 and their components in the deflection area 25*a*, 25*b* (see also FIG. 6).

In particular, the centrifugal force C must be taken into account for the upper run of the transport belt, since this could follow the centrifugal force C.

The free movement of the upper run of the transport belt 24 following the centrifugal force C is now limited by a downholder 218. The downholder 218 is arranged above the holding surface 242. When the belt carriage 21 is arranged in the plane conveying area 26*f*, no centrifugal force acts on the belt carriage 11. As soon as the belt carriage enters one of the deflection areas 25*a*, 25*b*, the centrifugal forces C act on the transport belt 24 radially outward (FIG. 15).

The downholder 218 limits a centrifugal force-induced lifting of sections of the transport belt 24. This reduces possible noise generation, since otherwise the lifting transport belt 24 may start to vibrate. In the conveying area 26*f*, the transport belt is arranged with play relative to the downholder 218. The downholder 218 thus does not generate any appreciable friction when the transport belt is moved in the transverse direction Q. Movement of the transport belt 24 in the transverse direction while the transport material 24 is located in the deflection area 25*a* is not necessary, so that the centrifugal force-induced contact of the transport belt 24 against the downholder 218 does not cause any detrimental effect here.

On the one hand, the transport belt 24 should be able to form a good frictional connection with the conveyed material; on the other hand, the transport belt should be held on the belt carriage with as little friction as possible.

The transport belt 24 is now formed on its upper surface 240 with comparatively high frictional capacity, while the transport belt is formed on its lower surface 24U with comparatively lower frictional capacity. In the context of this application, the frictional capacity thereby represents a measure of how great the coefficient of friction will be with an identical friction partner. A material with a high frictional capacity will form a higher coefficient of friction with an identical friction partner (e.g. steel) than a material with a lower frictional capacity.

The different friction properties can be achieved by different measures. For example, the different friction values may be produced by different surface conditions (rough or smooth, coated or uncoated) on the respective surface. Alternatively, the upper surface 240 of the transport belt 24 may be formed by a different material than the lower surface 24U of the transport belt 24.

The downholder 18 is preferably designed and arranged in such a way that, when the transport belt is deflected laterally (arrow P1 in FIG. 16), the transport belt 24 comes into contact with the downholder with the low-friction lower surface 24U (arrow P2 in FIG. 16) and not with the higher-friction upper surface 240.

In the embodiment of FIGS. 14 and 15, the guide surface 222 is attached to the belt carriage 21. When the belt carriage is in the conveying area 26*f*, the guide surface 212 is located below the intermediate surface 222.

The intermediate surface 222 is arranged on the intermediate carriage 22. A circumferential gap existing between the intermediate carriage 22 and the belt carriage is covered by the intermediate surface 222 and the guide surface 212. In addition, an elastomer element 223 is provided which can contribute to covering the circumferential gap between the intermediate surface 222 and the belt carriage. In this regard, the elastomer element 223 is arranged below the intermediate surface 222 and overlaps the intermediate surface as viewed in the conveying direction F. An overlap takes place regardless of whether the respective carriages are located in the deflection area 25*a* or in the conveying area 26*f*.

Elastomer element 223 may therefore come into contact with both portions of the belt carriage and portions of the intermediate carriage that are relatively moved with respect to each other. In embodiments, this contact may be unavoidable. It should be borne in mind that the carriages can be moved many times and that very precise guidance would only be feasible if extreme tolerances were maintained. Keeping them at a distance would therefore only be possible with comparatively high gaps, which in turn is undesirable for safety reasons.

The design as an elastomer element results in a noise-reducing effect. At the same time, the intermediate surface 222 remains the element that can come into contact with the conveyed material, since the intermediate surface is arranged above the elastomer element. In particular, the intermediate surface is made of a metal or a plastic with a comparatively smooth or low-friction surface.

In an alternative embodiment, it is possible that the elastomer element 223 is arranged on the belt carriage 21 in each case and projects in the direction of the intermediate carriage 22. The guide surface 212 is then arranged on the intermediate carriage 22.

FIG. 17a shows a section of the belt carriage 21 in one embodiment, the following explanations also applying as far as possible to the intermediate carriage 22. The basic structure of the carriage can also be seen in FIG. 17b.

The belt carriage frame 211 has a multi-part structure and comprises a base carrier 211G on the left and right, respectively, which in particular forms a type of chassis. The base carrier 211G can be arranged at a distance from one another or can also be fixedly connected to one another. Rollers 215 for guiding the carriage on the frame 28 (FIG. 5) are attached to the base carrier 211G in each case. The belt carriage 21 can also be attached to the drive belt 27 on the base carrier 211G.

A cross carrier 211Q is arranged between the two base carriers 211G, which in particular spans the distance between the two base carriers 211G. The transport belt 24 is attached to the cross carrier. In particular, the entire guide and drive of the transport belt 24, shown for example in FIG. 10, 10, is also located on the cross carrier 211Q.

The cross carrier 211Q can be removed separately from the base carrier 211G from the transfer device. To do this, first loosen a securing screw 211S which secures the cross carrier 211Q to the base carrier 211G. After loosening the locking screw, a latch 211R, which in the present case may be a movable component of the base carrier 211G, is transferred from a lock position to a release position (arrow P1 in FIG. 17a). The latch recess 211A on the cross carrier 211Q can be seen, in which the latch engages only in the lock position, not in the release position. After the latch has been moved to the release position, the cross carrier 211Q together with the transport belt 24 can be removed from the transfer device (arrows P2 in FIG. 17a), for example for maintenance purposes.

Figure 17:
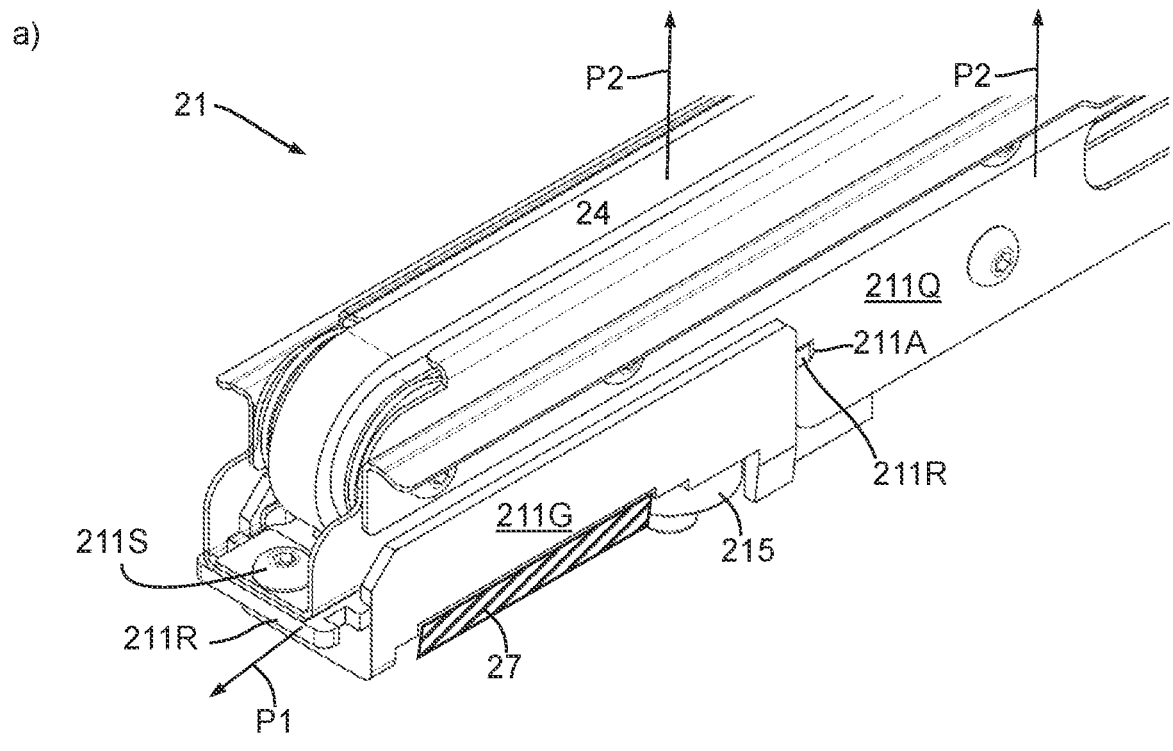
Figure 17:
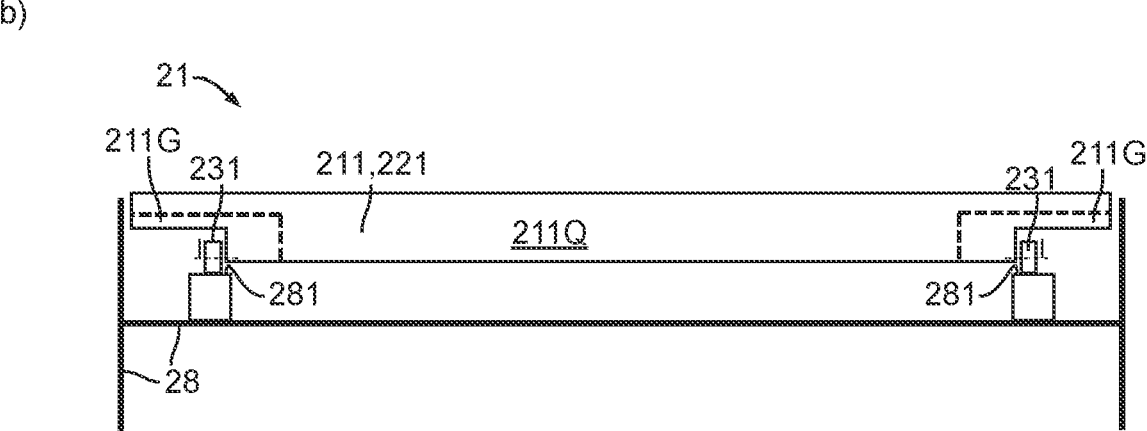

FIG. 14 illustrates the connection of the drive belt 27 to the respective carriage, in particular the belt carriage 21 and/or the intermediate carriage 22. The drive belt 27 is designed as a toothed belt. A connecting pin 271 engages in the teeth of the drive belt. The connecting pin 271 is firmly connected to the respective carriage. If the carriage is of multi-part design, as shown in particular in FIG. 17, the connecting pin can be fastened to the base carrier 211G, so that the separate removability of the cross carrier presented with reference to FIG. 17 is possible.

LIST OF REFERENCE SIGNS 1 conveyor system
3 transfer area
9 conveyed material
10 conveyor line
11 conveyor roller
12 gap bridge
20 transfer device
201 conveyor surface
21 belt carriage
211 belt carriage frame
211G base carrier
211Q cross carrier
211S securing screw
211R latch
211A latch recess
212 guide surface
214 belt roller
215 cross guidance roller

14

218 downholder
22 intermediate carriage
221 intermediate carriage frame
222 intermediate surface
223 elastomer element
23 guide
231 guide roller
232 auxiliary support
233 spring element
24 transport belt
240 upper run
24u lower run
240 upper surface
24U lower surface
241 support surface
242 holding surface
243 drive projection
25a, 25b deflection area
25L circumferential gap
25S protective cover
26a takeover area
26f conveying area
26b handover area
27 drive belt
271 connecting pin
28 frame
281 support surface
282 auxiliary surface
29 drive
291 motor
292 gearbox
31 belt drive
311 driven pulley
312 drive pulley
313 control flap
314 flap actuator
315 shaft connection
90 non-claimed crossbelt sorter
91 conveyor carriage
92 crossbelt
93 transfer station
94 transfer area
97 junction
98 infeed conveyor line
99 infeed area
V speed
v9 absolute speed of conveyed material
vF speed in conveying direction
vQ speed transverse to conveying direction
B24 width of transport belt in conveying direction
L21 length of belt carriage in conveying direction
X21 extension of the belt carriage in transverse direction
X24 extension of the transport belt in transverse direction
FR conveying direction
FE conveying plane
Q transverse direction
E infeed direction
A transfer direction
R return path
U deflection radius (radius of curvature in the deflection area)
UB circulation path
U deflection axis
W turning radius
A312 drive axis of drive pulley 312
H9 height of conveyed material
B9 smallest side length/width of conveyed material L9 largest side length/length of conveyed material
L20 length of transfer device
FS supporting force
FL load force
C centrifugal force

What is claimed is:

1. A transfer device, configured to receive material from an upstream first conveyor and convey the material along a planar conveying direction until transferring the conveyed material laterally to a transfer area or passing the conveyed material to a downstream second conveyor, the transfer device comprising:

a) a plurality of belt carriages arranged circumferentially along a guide to convey material in a conveying direction along a plane, wherein each belt carriage comprises a transport belt providing an at least temporary support surface for the conveyed material and which is movable transverse to the conveying direction to selectively transfer the conveyed material laterally;

b) a gap between neighboring carriages that is configured to enlarge when the neighboring carriages are deflected away from the plane; and c) an elastomeric element protruding from one carriage towards the neighboring carriage to at least partially cover the gap.

2. A transfer device, configured to receive material from an upstream first conveyor and convey the material along a planar conveying direction until transferring the conveyed material laterally to a transfer area or passing the conveyed material to a downstream second conveyor, the transfer device comprising a plurality of belt carriages arranged circumferentially along a guide to convey material in a conveying direction, wherein each belt carriage comprises a transport belt movable transverse to the conveying direction to selectively transfer the conveyed material laterally, further wherein each belt carriage comprises a guide surface arranged adjacent upstream or downstream of the transport belt in the conveying direction, further wherein the guide surface does not move transverse to the conveying direction.

3. A transfer device, configured to receive material from an upstream first conveyor and convey the material along a planar conveying direction until transferring the conveyed material laterally to a transfer area or passing the conveyed material to a downstream second conveyor, the transfer device comprising a plurality of belt carriages arranged circumferentially along a guide to convey material in a conveying direction, wherein each belt carriage comprises:

a) a transport belt movable transverse to the conveying direction to selectively transfer the conveyed material laterally;

b) a base carrier and a cross carrier, wherein the transport belt is attached to the cross carrier; and c) a releasable securing mechanism that releases the cross carrier from the base carrier for releasing and securing the transport belt.

4. The transfer device of claim 1, wherein the transfer device is configured to hand over conveyed material that is not transferred to a downstream conveyor line.

5. The transfer device of claim 1, wherein the belt carriage extends in the conveying direction no more than 120 mm.

6. The transfer device of claim 1, wherein the belt carriage or the transport belt extends in the transverse direction at least 400 mm.

7. The transfer device of claim 1, wherein the transport belt has a width in the conveying direction of at most 100 mm.

8. The transfer device of claim 1, wherein the belt carriage extends longer in the transverse direction compared to the conveying direction.

9. The transfer device of claim 1, wherein the circumferential arrangement further comprises a downward circulation path with a deflection radius of no more than 250 mm.

10. The transfer device of claim 1, further comprising a drive pulley, wherein the transport belt is driven by the drive pulley, further wherein the transport belt is twisted between a bearing surface and the drive pulley.

11. The transfer device of claim 1, wherein the gap is sufficiently covered to prevent any penetration of the conveyed material through the gap.

12. The transfer device of claim 1, further comprising an intermediate surface underneath the neighboring carriages, wherein the intermediate surface and the belt carriage partially overlap when conveying along the plane.

13. The transfer device of claim 1, wherein the elastomer element is arranged on a first of the neighboring carriages in such a way that the elastomer element overlaps a guide surface on a second of the neighboring carriages when moving in the conveying direction, wherein the guide surface is adjacent the transport belt and does not move transverse to the conveying direction.

14. The transfer device according to claim 1, wherein the belt carriages further comprise a guide surface adjacent the transport belt and that does not move transverse to the conveying direction, the transfer device further comprising a concave intermediate surface underneath the neighboring cartridges, so that during conveyance, the guide surface at least temporarily or partly covers the intermediate surface.

15. The device according to claim 1, wherein the transport belt moves transverse to the conveying direction at a greater speed than in the conveying direction.

16. The transfer device according to claim 1, further comprising a main guide that mounts the belt carriage vertically with respect to a frame and an auxiliary guide that when the belt carriage is overloaded, transitions from a non-load transmitting state to a load-transmitting state.

17. The transfer device according to claim 16, wherein the transition from the non-load-transmitting state to the load-transmitting state is caused by means of an elastic deformation within the carriage.

18. The transfer device according to claim 1, wherein the belt carriage further comprises a downholder arranged to limit upward movement of an upper run of the transport belt.

19. The transfer device according to claim 18, wherein the downholder is arranged below the support surface.

20. The transfer device according to claim 3, wherein the securing mechanism comprises a latch which can be transferred between a locked position and a release position.

21. A conveyor system, comprising:

a) a first conveyor line;

b) a transfer device that receives conveyed material from the first conveyor line, the transfer device comprising plurality of belt carriages arranged circumferentially along a guide and movable at least temporarily in a planar conveying direction, the at east one of the belt carriages comprising a transport belt forming at least temporarily a support surface for conveyed material, wherein the transport belt is selectively movable in a transverse direction transverse to the conveying direction for selective lateral transfer of the conveyed material; and c) a gap bridge, arranged below the conveying plane in a gap between the first conveyor line and the transfer device or between the transfer device and a second conveyor line, wherein the gap bridge provides another support surface for the conveyed material, but without a conveying element.

22. The conveyor system according to claim 21, further comprising the second conveyor line, wherein material to be conveyed is provided by the transfer device to the second conveyor line in the conveying direction and in the conveying plane.

23. The conveyor system according to claim 22, wherein the gap bridge extends in the conveying direction no more than 60 mm.

* * * * *